US012720360B2

(12) United States Patent
Huang et al.

(10) Patent No.: US 12,720,360 B2
(45) Date of Patent: Aug. 25, 2026

(54) INFORMATION COMMUNICATION METHOD, APPARATUS AND COMMUNICATIONS DEVICE

(71) Applicant: DATANG MOBILE COMMUNICATIONS EQUIPMENT CO., LTD., Beijing (CN)

(72) Inventors: Yuanfang Huang, Beijing (CN); Hao Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 464 days.

(21) Appl. No.: 18/257,861

(22) PCT Filed: Nov. 24, 2021

(86) PCT No.: PCT/CN2021/132706

§ 371 (c)(1),
(2) Date: Jun. 15, 2023

(87) PCT Pub. No.: WO2022/148164

PCT Pub. Date: Jul. 14, 2022

(65) Prior Publication Data

US 2024/0098554 A1 Mar. 21, 2024

(30) Foreign Application Priority Data

Jan. 6, 2021 (CN) ......................... 202110012220.6

(51) Int. Cl.
*H04W 28/02* (2009.01)
*H04W 28/16* (2009.01)

(52) U.S. Cl.
CPC ....... *H04W 28/0268* (2013.01); *H04W 28/16* (2013.01)

(58) Field of Classification Search
None
See application file for complete search history.

(56) References Cited

U.S. PATENT DOCUMENTS

2011/0044186 A1* 2/2011 Jung ..................... H04L 1/1607 370/252
2017/0324652 A1* 11/2017 Lee ..................... H04L 47/2458
(Continued)

FOREIGN PATENT DOCUMENTS

CN 109600761 A 4/2019
CN 111510959 A 8/2020
(Continued)

OTHER PUBLICATIONS

3GPP TR32.913, Jul. 2020 (Year: 2020).*
(Continued)

*Primary Examiner* — Andre Tacdiran
(74) *Attorney, Agent, or Firm* — Ladas & Parry, LLP

(57) ABSTRACT

The present disclosure provides an information communication method, an apparatus and a communications device. The method of the present disclosure includes: obtaining target policy information; sending the target policy information to a second communications device, where the target policy information includes at least one of the following: a reliability index for indicating a success probability of data transmission; a bandwidth index for indicating a system bandwidth; or a spectral efficiency index for indicating a spectral efficiency.

18 Claims, 2 Drawing Sheets

(56) References Cited

U.S. PATENT DOCUMENTS

2020/0329381 A1 10/2020 Chou
2021/0022131 A1* 1/2021 Liu ....................... H04W 72/23
2021/0144707 A1* 5/2021 Wu ................... H04W 72/0453

FOREIGN PATENT DOCUMENTS

| | | | |
|---|---|---|---|
| CN | 111565418 | B | 12/2020 |
| CN | 112073991 | A | 12/2020 |
| EP | 3675549 | A1 | 7/2020 |
| EP | 3709708 | A1 | 9/2020 |
| WO | 2017078770 | A1 | 5/2017 |
| WO | 2020040723 | A1 | 2/2020 |
| WO | 2022011862 | A1 | 1/2022 |

OTHER PUBLICATIONS

RAN Study-on-O-RAN-Slicing-v02.00) (Year: 2020).*
ORAN—A1 Policy Management Service API (2019) (Year: 2019).*
Extended European Search Report for European Patent Application No. 21917205.3 issued by the European Patent Office on Jun. 19, 2024.
First Japanese Office Action for Japanese patent application No. 2023-536088 issued by the Japanese Patent Office on May 21, 2024 and its English translation provided by foreign associate.
3rd Generation Partnership Project; Technical Specification Group Radio Access Network; Study on Scenarios and Requirements for Next Generation Access Technologies; (Release 16) 3GPP TR 38.913, Jul. 2020.
"O-RAN: Towards an Open and Smart RAN," White Paper, Oct. 2018, Final+181017, O-RAN Allience.
"LS on O-RAN Alliance & 3GPP Coordination on O-RAN Alliance Outputs," 3GPP TSG RAN WG2#107bis R2-1912007, Chongqing, China, Oct. 14-18, 2019, Source: O-RAN Alliance SDFG, Virtual Meeting, Sep. 5, 2019.
O-RAN Alliance, "LS on O-RAN Alliance & 3GPP Coordination on O-RAN Alliance Outputs", S2-1908728, SA WG2 Meeting #S2-135, Sep. 17, 2019 (Sep. 17, 2019), entire document.
O-RAN: Towards an Open and Smart RAN (White Paper, Oct. 2018).
Office action from European Patent Application No. 21917205.3 dated Mar. 6, 2025.
Office action from corresponding South Korean Patent Application No. 10-2023-7026447 dated Aug. 12, 2025.
3GPP, TR 38.913 v16.0.0, study on Scenarios and Requirements for Next Generation Access Technologies, 3GPP server publication date (Jul. 18, 2020), France, 40 pages.
S. Niknam et al., and "Intelligent O-RAN for Beyond 5G and 6G Wireless Networks" eprint arXiv: 2005.08374v1,pp. 1-7 (May 17, 2020).
PCT International Search Report from PCT/CN2021/132706 dated Jan. 20, 2023 and its English translation.
PCT International Preliminary Report on Patentability (Chapter I) from PCT/CN2021/132706 dated Jul. 4, 2023 and its English translation from WIPO.

* cited by examiner

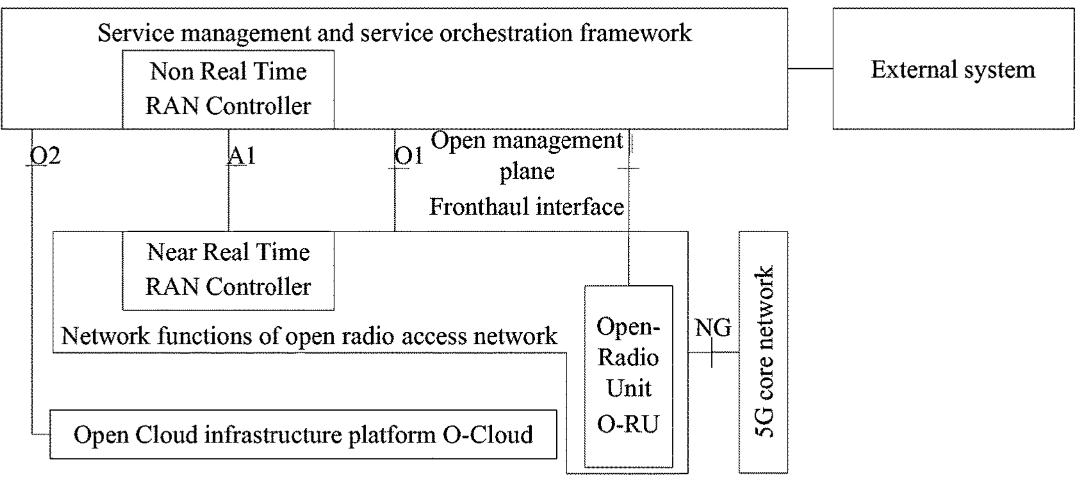
FIG.1
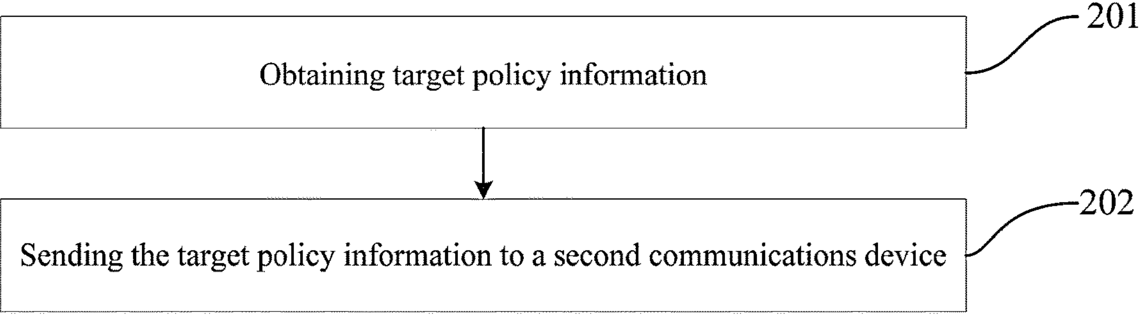
FIG.2
Receiving target policy information, where the target policy information includes at least one of the following: a reliability index for indicating a success probability of data transmission; a bandwidth index for indicating a system bandwidth; or a spectral efficiency index for indicating a spectral efficiency
301
FIG.3

INFORMATION COMMUNICATION METHOD, APPARATUS AND COMMUNICATIONS DEVICE

CROSS-REFERENCE TO RELATED APPLICATIONS

The present application is the U.S. national phase of PCT Application No. PCT/CN2021/132706 filed on Nov. 24, 2021, which claims a priority to Chinese patent application No. 202110012220.6 filed on Jan. 6, 2021, the disclosures of which are incorporated herein by reference in their entireties.

TECHNICAL FIELD

The present disclosure relates to the technical field of communications, and in particular, to an information communication method, an information communication apparatus and a communications device.

BACKGROUND

As an object and a guidance for performing an intelligent network optimization control by a near real time radio access network intelligent controller (Near Real Time RAN Intelligent Controller, Near-RT RIC), The A1 policy may directly affect the result of the optimization control on the radio network performed by the Near-RT RIC.

In related technology, the A1 policy is only limited to indexes including quality of service (Quality of Service, QoS), quality of experience (Quality of Experience, QoE) and traffic steering preference (traffic steering preference). These indexes cannot meet various service requirements and system requirements of the radio network, so that the Near-RT RIC lacks of a capability for flexibly ensuring the resource optimization.

SUMMARY

The present disclosure is to provide an information communication method, an information communication apparatus, and a communications device, so as to address the issue in the related art that the A1 policy cannot meet various service requirements and system requirements of the radio network, so that the Near-RT RIC lacks of a capability for flexibly ensuring the resource optimization.

For addressing the above mentioned issue, an embodiment of the present disclosure provides an information communication method, performed by a communications device, where the communications device is a first communications device, and the method includes:

obtaining target policy information;

sending the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

The sending the target policy information to the second communications device includes:

sending, through an A1 interface, the target policy information to the second communications device.

The target policy information includes the reliability index; and the obtaining the target policy information includes:

obtaining service related information, where the service related information includes: first data for representing a service scenario and second data for representing a service requirement; and performing, according to the service related information, a calculation to obtain the reliability index.

The target policy information includes the bandwidth index; and the obtaining the target policy information includes:

obtaining a bandwidth requirement of a first cell or a first base station; and generating, according to the bandwidth requirement, a bandwidth index corresponding to the first cell or the first base station.

The target policy information includes the spectral efficiency index; and the obtaining the target policy information includes:

obtaining a key performance indicator of operation management and currently managed radio network information; and obtaining, according to the key performance indicator and the radio network information, a spectral efficiency index for each managed cell or each managed base station.

For addressing the above mentioned issue, an embodiment of the present disclosure further provides an information communication method, performed by a communications device, where the communications device is a second communications device, and the method includes:

receiving target policy information;

where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

The receiving the target policy information includes:

receiving, through an A1 interface, the target policy information sent by the first communications device.

After receiving the target policy information, the method further includes:

obtaining radio resource related information of a radio access network RAN side; and performing a radio resource optimization according to the radio resource related information and the target policy information.

For addressing the above mentioned issue, an embodiment of the present disclosure further provides a communications device, the communications device is a first communications device, including: a memory, a transceiver, and a processor, where the memory is configured to store a computer program; the transceiver is configured to send and receive data under the control of the processor; and the processor is configured to read the computer program in the memory and perform the following operations:

obtaining target policy information; and sending, through the transceiver, the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

The transceiver is further configured to:

send, through an A1 interface, the target policy information to the second communications device.

The target policy information includes the reliability index;

the processor is further configured to:

obtain service related information, where the service related information includes: first data for representing a service scenario and second data for representing a service requirement; and perform, according to the service related information, a calculation to obtain the reliability index.

The target policy information includes the bandwidth index; and the processor is further configured to:

obtain a bandwidth requirement of a first cell or a first base station; and generate, according to the bandwidth requirement, a bandwidth index corresponding to the first cell or the first base station.

The target policy information includes the spectral efficiency index; and the processor is further configured to:

obtain a key performance indicator of operation management and currently managed radio network information; and obtain, according to the key performance indicator and the radio network information, a spectral efficiency index for each managed cell or each managed base station.

For addressing the above issue, an embodiment of the present disclosure also provides an information communication apparatus, including:

an obtaining module, configured to obtain target policy information; and a first communication module, configured to send the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

The first communication module includes:

a sending unit, configured to send, through an A1 interface, the target policy information to the second communications device.

The target policy information includes the reliability index; and the obtaining module includes:

a first obtaining unit, configured to obtain service related information, where the service related information includes: first data for representing a service scenario and second data for representing a service requirement; and a calculating unit, configured to perform, according to the service related information, a calculation to obtain the reliability index.

The target policy information includes the bandwidth index; and the obtaining module includes:

a second obtaining unit, configured to obtain a bandwidth requirement of a first cell or a first base station;

a generating unit, configured to generate, according to the bandwidth requirement, a bandwidth index corresponding to the first cell or the first base station.

The target policy information includes the spectral efficiency index; and the obtaining module includes:

a third obtaining unit, configured to obtain a key performance indicator of operation management and currently managed radio network information; and a processing unit, configured to obtain, according to the key performance indicator and the radio network information, a spectral efficiency index for each managed cell or each managed base station.

For addressing the above issue, an embodiment of the present disclosure further provides a communications device, the communications device is a second communications device, including: a memory, a transceiver, and a processor, where the memory is configured to store a computer program; the transceiver is configured to send and receive data under the control of the processor; and the processor is configured to read the computer program in the memory and perform the following operations:

receiving, through the transceiver, target policy information, where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

The transceiver is further configured to:

receive, through an A1 interface, the target policy information sent by the first communications device.

The processor is further configured to:

obtain radio resource related information of a radio access network RAN side;

perform a radio resource optimization according to the radio resource related information and the target policy information.

For addressing the above issue, an embodiment of the present disclosure also provides an information communication apparatus, including:

a second communication module, configured to receive target policy information;

where the target policy information includes at least one of the following:

a reliability index for indicating a success probability of data transmission;

a bandwidth index for indicating a system bandwidth; or a spectral efficiency index for indicating a spectral efficiency.

The reliability index includes:

a first quantity of bytes of data transmission;

a first time required for data transmission; and a success probability of transmitting the first quantity of bytes within the first time.

The bandwidth index includes: a maximum aggregation total system bandwidth.

The spectral efficiency index includes at least one of the following:

a spectral efficiency of a cell;

a spectral efficiency of a transmission point;

a spectral efficiency of a transmission reception point TRxP; or an edge spectral efficiency, wherein the edge spectral efficiency is a user spectral efficiency corresponding to a preset percentage of a cumulative distribution function.

The second communication module includes:

a receiving unit, configured to receive, through an A1 interface, the target policy information sent by a first communications device.

The apparatus further includes:

a second obtaining module, configured to obtain radio resource related information of a radio access network RAN side; and a processing module, configured to perform a radio resource optimization according to the radio resource related information and the target policy information.

For addressing the above issue, an embodiment of the present disclosure further provides a processor-readable storage medium, having a computer program stored thereon, and the computer program is used to cause the processor to perform the steps of the above mentioned information communication method.

The technical solution of the present disclosure has at least the following beneficial effects.

In the technical solution of the embodiment of the present disclosure, the target policy information is obtained and then the target policy information is sent to the second communications device, the target policy information including at least one of the following: a reliability index for indicating a success probability of data transmission; a bandwidth index for indicating a system bandwidth; or a spectral efficiency index for indicating a spectral efficiency. As such, by using the new target policy information, the policy management capability can be improved to meet the various service requirements and the system requirements of the radio network, thereby improving the capability of controlling and optimizing the radio network by the communications device.

BRIEF DESCRIPTION OF THE DRAWINGS

FIG. 1 is a schematic view of an O-RAN architecture in the related art;

FIG. 2 is a first flowchart of an information communication method provided by an embodiment of the present disclosure;

FIG. 3 is a second flowchart of the information communication method provided by an embodiment of the present disclosure;

DETAILED DESCRIPTION

Figure 4:
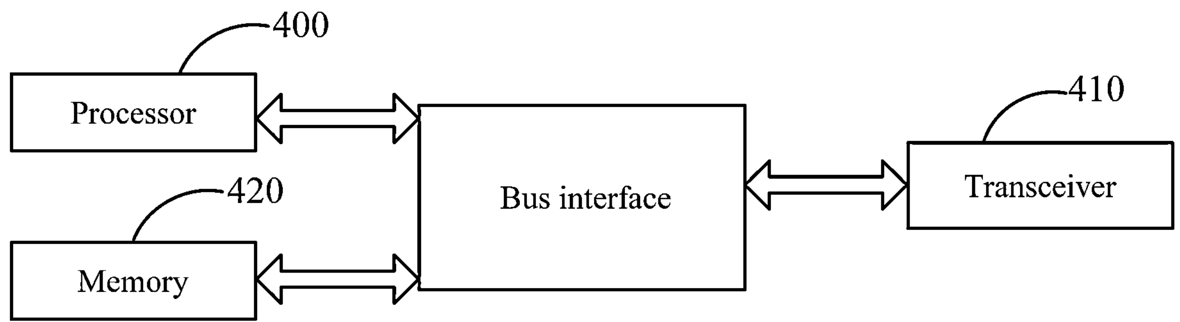
FIG. 4 is a first structural block diagram of an information communication apparatus according to an embodiment of the present disclosure.

The term "and/or" in the embodiments of the present disclosure describes an association relationship of associated objects, which indicates that there may be three relationships. For example, A and/or B, which may refer to three cases: A alone, both A and B, and B alone. The character "/" generally indicates that the associated objects in the context are subject to "or" relationship.

The term "plurality" in the embodiments of the present disclosure refers to two or more. The same applies to other quantifiers.

The technical solutions in the embodiments of the present disclosure will be described clearly and completely below with reference to the drawings of the embodiments of the present disclosure. Apparently, the described embodiments are only some, rather than all, of the embodiments of the present disclosure. Based on the embodiments in the present disclosure, all other embodiments, which can be obtained by one of ordinarily skilled in the art without making creative efforts, fall within the protection scope of the present disclosure.

It should be noted that the method of the present disclosure may be applicable to an open radio access network (Open Radio Access Network, O-RAN) architecture. Hereinafter, the O-RAN architecture in the related art will be briefly described.

As shown in FIG. 1, the non-real-time radio access network intelligent controller (Non Real Time RAN Intelligent Controller, Non-RT RIC) in the O-RAN architecture adopts an intelligent method for providing, through an A1 interface to the Near-RT RIC, a policy for the radio access network (Radio Access Network, RAN) optimization as a guidance for RAN intelligent optimization and control.

Currently, in O-RAN related specifications, policies provided by the A1 interface are only limited to some indexes such as QoS, QoE and traffic steering preference. The inventors have found, through the research, that the indexes which can be currently provided by O-RAN are not enough to meet various service requirements and the system requirements of the radio network in various service applications for individuals (To Consumer, ToC) and enterprises (To Business, ToB). As a result, the conventional Near-RT RIC lacks of a capability for flexibly ensuring the resource optimization.

In order to address the above issue, embodiments of the present disclosure provide an information communication method, an information communication apparatus, and a communications device. The method and the apparatus are conceived based on the same idea, and implementations of the apparatus and the method may be referred to each other since the principles for addressing the issue by the method and the apparatus are similar, and the redundant description will be omitted herein.

As shown in FIG. 2, FIG. 2 is a flowchart of an information communication method provided by an embodiment of the present disclosure. The method is performed by a communications device, and the communications device is a first communications device. Optionally, the first communications device is a Non-RT RIC. The method may include steps 201 to 201.

In step 201, target policy information is obtained.

Optionally, the target policy information includes at least one of the following:

- a reliability index for indicating a success probability of data transmission;
- a bandwidth index for indicating a system bandwidth; or
- a spectral efficiency index for indicating a spectral efficiency.

Here, the reliability index specifically refers to: a success probability of transmitting X bytes within a specific delay, where the delay is the time required to transferring a small data packet from an entry point of a radio protocol layer 2/3 service data unit (Service Data Unit, SDU) of a radio interface to an exit point of the radio protocol layer 2/3 SDU under a specific channel quality (e.g., coverage edge).

It should be noted that X represents a size of the data packet, which may be a pre-configurable value.

Here, the bandwidth index is a system index of the radio access network. The bandwidth index may be served as one of the A1 policies.

Here, the spectral efficiency index is a system index of the radio access network. The spectral efficiency index may be served as one of the A1 policies.

In step 202, the target policy information is sent to a second communications device;

Here, the second communications device may optionally be a Near-RT RIC.

In the information communication method provided by the embodiment of the present disclosure, by obtaining the target policy information and sending the target policy information to the second communications device, where the target policy information includes at least one of the following: the reliability index for indicating the success probability of data transmission; the bandwidth index for indicating the system bandwidth; the spectral efficiency index for indicating the spectral efficiency, the policy management capability can be improved with the new target policy information, such that various service requirements and system requirements of the radio network can be satisfied, thereby improving the capability for controlling and optimizing the radio network by the communications device.

Optionally, the reliability index includes:

- a first quantity of bytes of data transmission;
- a first time required for data transmission; and
- a success probability of transmitting the first quantity of bytes within the first time.

Here, optionally, the reliability index forms corresponding target policy information according to a first preset format. Here, the first preset format may refer to a format in Table 1, that is, the reliability index forms a corresponding A1 policy according to the format in Table 1.

TABLE 1

| Attribute name (Attribute name) reliability (reliability) | Data type (Data type) | P | Cardinality (Cardinality) | Description (Description) | Applicability (Applicability) |
|---|---|---|---|---|---|
| ->scenario context (scenario context) | | | | Contextual information related to a target service, for determining a specific application scenario, service and user | |
| -->PLMN ID (Public Land Mobile Network Identifier) | | | | | |
| -->cell ID (cell identifier) | | | | | |
| -->slice ID (slice identifier) | | | | | |
| -->user ID (user identifier) | | | | | |
| -->QoS ID (quality of service identifier) | | | | | |
| > the success probability (success probability) | number (number) | "C" | "0 . . . 1" | The success probability of transmitting X bytes within the specific delay, where the delay is the time required to transfer a small data packet from an entry point of a radio protocol layer 2/3 service data unit (Service Data Unit, SDU) of a radio interface to an exit point of the radio protocol layer 2/3 SDU with a certain channel quality (e.g., coverage edge) | |
| ->the packet size (packet size) | | | | Configuration of the quantity of bytes for transmission | |
| ->the transmission delay (transmission delay) | | | | The time required to transfer the small data packet from the entry point of the radio protocol layer 2/3 SDU to the exit point of the radio protocol layer 2/3 SDU of the radio interface with the certain channel quality (e.g., coverage edge) | |

Note:
the presence condition "C" indicates that at least one attribute is to be included if this statement is used.

Optionally, the bandwidth index includes: a maximum aggregation total system bandwidth.

Here, optionally, the bandwidth index forms corresponding target policy information according to a second preset format.

Here, the second preset format may refer to a format in Table 2, that is, the bandwidth index forms a corresponding A1 policy according to the format in Table 2.

TABLE 2

| Attribute name (Attribute name) | Data type (Data type) | P | Cardinality (Cardinality) | Description (Description) | Applicability (Applicability) |
|---|---|---|---|---|---|
| system bandwidth | | | | | |
| ->scenario context (scenario context) | | | | Contextual information related to the target service, configured to determine the specific scenario and service of the application | |
| -->PLMN ID (Public Land Mobile Network Identifier) | | | | | |
| -->cell ID (cell identifier) | | | | | |
| -->slice ID (slice identifier) | | | | | |
| ->system bandwidth | number (number) | "C" | 0 to the maximum bandwidth that can be provided by the actual system | The maximum aggregation total system bandwidth. It can be supported by a single or multiple Radio Frequency (RF) carriers | |

Optionally, the spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

Here, optionally, the preset percentage is 5%.

Here, optionally, the spectral efficiency index forms corresponding target policy information according to a third preset format.

Here, the third preset format may refer to a format in Table 3, that is, the spectral efficiency index forms a corresponding A1 policy according to the format in Table 3.

TABLE 3

| Attribute name (Attribute name) | Data type (Data type) | P | Cardinality (Cardinality) | Description (Description) | Applicability (Applicability) |
|---|---|---|---|---|---|
| spectral efficiency (spectral efficiency) | | | | | |
| ->scenario context (scenario context) | | | | | |
| -->PLMN ID (Public Land Mobile Network Identifier) | | | | | |
| -->cell ID (cell identifier) | | | | | |
| -->slice ID (slice identifier) | | | | | |
| ->Cell/Transmission Point/TRxP spectral efficiency (Spectral | number (number) | "C" | | The spectral efficiency of transmission reception point | |

TABLE 3-continued

| Attribute name (Attribute name) | Data type (Data type) | P | Cardinality (Cardinality) | Description (Description) | Applicability (Applicability) |
|---|---|---|---|---|---|
| efficiency of the cell/transmission point/transmission reception point) | | | | (Transmission Reception Point, TRxP) is defined as the total throughput of all users (the quantity of bits received correctly, that is, the quantity of bits included in service data unit (SDU) transferred to the third layer within a certain time period) being divided by the channel bandwidth and the quantity of TRxPs. A 3-sector station includes 3 TRxPs. In a case that there are multiple non-contiguous "carriers" (a carrier refers to a contiguous spectral block), key performance indicator (Key Performance Indicator, KPI) is calculated per carrier. In this case, the aggregation throughput, channel bandwidth and the quantity of TRxPs on a specific carrier are used. | |
| -> spectral efficiency of $5^{th}$ percentile | number (number) | "C" | "0 . . . 1" | User spectral efficiency at $5^{th}$ percentile refers to 5% of a cumulative distribution function (Cumulative Distribution Function, CDF) of a normalized user throughput the (normalized) user throughput is defined as an average user throughput (the quantity of bits correctly received by the user within a certain time period, i.e. the quantity of bits included in the SDU transferred to the third layer) | |

TABLE 3-continued

| Attribute name (Attribute name) | Data type (Data type) | P | Cardinality (Cardinality) | Description (Description) | Applicability (Applicability) |
|---|---|---|---|---|---|
| | | | | divided by the channel bandwidth, and is measured in bit/second/hertz. To this end, the channel bandwidth is defined as an effective bandwidth multiplied by a frequency reuse factor, where the effective bandwidth is an operation bandwidth which is properly normalized by considering the uplink/downlink ratio. In a case that there are multiple non-contiguous "carriers" (a carrier refers to a contiguous spectral block), this KPI should be calculated per carrier. In this case, a channel bandwidth and a user throughput on a specific carrier are used. | |
| ->the channel bandwidth | number (number) | "C" | 0 to the maximum bandwidth that can be provided by the actual system | The maximum aggregation total system bandwidth. It can be supported by a single or multiple Radio Frequency (RF) carriers | |

As an optional implementation, the step of sending the target policy information to the second communications device includes:

sending, through an A1 interface, the target policy information to the second communications device.

Here, in a case that the method is applied in the O-RAN architecture, the first communications device is a Non-RT RIC, and the second communications device is a Near-RT RIC, then the target policy information is sent to the second communications device through the A1 interface.

As an optional implementation, the target policy information includes the reliability index, and accordingly, the step of obtaining the target policy information includes:

obtaining service related information, where the service related information includes: first data for representing a service scenario and second data for representing a service requirement; and performing, according to the service related information, a calculation to obtain the reliability index.

Here, the service related information may be obtained through an interface between the first communications device and a service layer.

Afterwards, the corresponding target policy information may be formed by using the reliability index according to the first preset format.

It should be noted that by adding the reliability index as the target policy information (such as the A1 policy information), the second communications device such as Near-RT RIC can be provided with a capability for performing optimization with respect to the reliability of the user, network, and service.

As an optional implementation, the target policy information includes the bandwidth index, and accordingly, the step of obtaining the target policy information includes:

obtaining a bandwidth requirement of a first cell or a first base station; and generating, according to the bandwidth requirement, a bandwidth index corresponding to the first cell or the first base station.

It should be noted that the first communications device has a capability for predicting the service traffic, and the bandwidth requirement of the first cell or the first base station can be obtained through prediction;

Afterwards, the corresponding target policy information may be formed by using bandwidth index according to the second preset format.

It should be noted that the policy is configured by the first communications device, such as the Non-RT RIC, according to actual service condition, and then sent to the second communications device, such as Near-RT RIC. In a case that the second communications device performs a radio resource optimization, the radio resource optimization is performed with the bandwidth index specified by the configured target policy information.

As an optional implementation, the target policy information includes the spectral efficiency index, and accordingly, the step of obtaining the target policy information includes:

obtaining a key performance indicator of operation management and currently managed radio network information; and obtaining, according to the key performance indicator and the radio network information, a spectral efficiency index for each managed cell or each managed base station.

Here, the key performance indicator KPI of operation management is issued by the operator.

Afterwards, the corresponding target policy information may be formed by using the spectral efficiency index according to the third preset format.

It should be noted that the spectral efficiency index is sent by the first communications device, such as Non-RT RIC, to the second communications device, such as Near-RT RIC, and the second communications device can perform an associating radio resource optimization to meet the requirement for the spectral efficiency index.

In the information communication method of the embodiments in the present disclosure, by obtaining target policy information and sending the target policy information to the second communications device, where the target policy information includes at least one of the following: the reliability index for indicating the success probability of data transmission; the bandwidth index for indicating the system bandwidth; or the spectral efficiency index for indicating the spectral efficiency, the policy management capability can be improved by using the new target policy information, such that various service requirements and system requirements of the radio network can be satisfied, thereby improving the capability for controlling and optimizing the radio network by communications device.

As shown in FIG. 3, FIG. 3 is a flowchart of an information communication method provided by an embodiment of the present disclosure. The method is performed by a communications device, and the communications device is a second communications device. Optionally, the second communications device is a Near-RT RIC. The method may include step 301.

In step 301, target policy information is received.

The target policy information includes at least one of the following:

a reliability index for indicating a success probability of data transmission;

a bandwidth index for indicating a system bandwidth; or a spectral efficiency index for indicating a spectral efficiency.

Here, specifically, the target policy information sent by the first communications device is received.

In the information communication method of embodiments of the present disclosure, by receiving the target policy information, where the target policy information includes at least one of the following: the reliability index for indicating the success probability of data transmission; the bandwidth index for indicating the system bandwidth; or the spectral efficiency index for indicating the spectral efficiency, the policy management capability can be improved by receiving the new target policy information, such that various service requirements and system requirements of the radio network can be satisfied, thereby improving the capability for controlling and optimizing the radio network by the communications device.

Optionally, the reliability index includes:

a first quantity of bytes of data transmission;

a first time required for data transmission; and a success probability of transmitting the first quantity of bytes within the first time.

Optionally, the bandwidth index includes: a maximum aggregation total system bandwidth.

Optionally, the spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

As an optional implementation, the receiving the target policy information includes:

receiving, through an A1 interface, the target policy information sent by the first communications device.

Here, in a case that the method of this disclosure is applied in the O-RAN architecture, the first communications device is a Non-RT RIC, and the second communications device is a Near-RT RIC, then the target policy information sent by the first communications device is received through the A1 interface.

As an optional implementation, after receiving the target policy information, the method of embodiments in the present disclosure further comprises:

obtaining radio resource related information of a radio access network RAN side; and performing a radio resource optimization according to the radio resource related information and the target policy information.

Here, the radio resource related information of the RAN (Radio Access Network, radio access network) side may be reported by the terminal or be obtained by performing a calculation according to information reported by the terminal.

It should be noted that the radio resource related information includes, but is not limited to: s radio resource occupied by the terminal, a priority of the resource occupied by the terminal, a target cell to which the terminal is switched, and the like.

Here, in a case that the target policy information includes the reliability index, the step of performing a radio resource optimization may specifically include:

determining, according to the radio resource related information, a current value or a predicted value of a reliability index of a corresponding target service; and in a case that the current value or the predicted value of the reliability index of the target service does not meet the reliability index in the target policy information, performing the radio resource optimization.

In other words, in a case that the current value or the predicted value of the reliability index of the target service does not meet the reliability index in the target policy information, the second communications device initiates an optimization and control process to perform the radio resource optimization, so as to guarantee the policy target for the reliability of the target service.

Here, in a case that the target policy information includes the bandwidth index, the step of performing a radio resource optimization may specifically include:

performing a radio resource reconfiguration and optimization according to the radio resource related information and the target policy information.

Here, the radio resource is reconfigured and optimized according to the system bandwidth carried in the target policy information in conjunction with the radio resource related information, the KPI indicator on the radio side can be ensured in a case that the bandwidth index is met.

Here, in a case that the target policy information includes the spectral efficiency index, the step of performing a radio resource optimization may specifically include:

determining, according to the radio resource related information, a current value or a predicted value of a spectral efficiency index of a corresponding target cell or a target base station; and in a case that the current value or predicted value of the spectral efficiency index of the target cell or the target base station does not meet the spectral efficiency index in the target policy information, performing the radio resource optimization.

In other words, in a case that the current value or the predicted value of the spectral efficiency index of the target cell or the target base station does not meet the spectral efficiency index in the target policy information, the second communications device initiates an optimization and control process to perform the radio resource optimization, so as to guarantee the policy target for the spectral efficiency of the target cell or target base station.

Hereinafter, how the reliability index, the bandwidth index and the spectral efficiency index are applied will be described with respect to the following three embodiments.

Embodiment 1: Application Process of the Reliability Index a1. An Non-RT RIC performs a calculation to obtain the reliability index according to a specific service scenario and requirement.

For example, the Internet of Vehicles scenario is 99.9999%, and the data packet size is 300 bytes.

a2. The Non-RT RIC forms a corresponding A1 policy by using the reliability index according to the format of Table 1.

a3. The Non-RT RIC sends the formed A1 policy to a Near-RT RIC through an A1 interface.

a4. The Near-RT RIC receives the A1 policy, which is related to the reliability, from the A1 interface.

a5. The Near-RT RIC analyzes radio resource related information of an RAN side which is obtained from a base station. In a case that a current value or a predicted value of a reliability index of a corresponding service does not meet a target in the A1 policy, the Near-RT RIC initiates an optimization and control process to perform a radio resource optimization, so as to guarantee the policy target for the reliability of the service.

Embodiment 2: Application Process of the Bandwidth Index b1. A Non-RT RIC, which has the capability for predicting the service traffic, may perform a prediction to obtain a bandwidth requirement of a certain cell/base station, and generate, based on the prediction, a bandwidth index of the cell/base station;

b2. The Non-RT RIC forms a corresponding A1 policy by using the bandwidth index according to the format of Table 2.

b3. The Non-RT RIC sends the formed A1 policy to a Near-RT RIC through an A1 interface.

b4. The Near-RT RIC receives the A1 policy, which is related to the bandwidth index, from the A1 interface.

b5. The Near-RT RIC reconfigures and optimizes the radio resource according to a system bandwidth carried in the A1 policy and radio resource related information of an RAN side obtained from a base station, so as to guarantee a KPI indicator on a radio side in a case that the bandwidth index is met.

Embodiment 3: Application Process of the Spectral Efficiency Index c1. An Non-RT RIC forms a spectral efficiency index for cells/base stations in different regions according to an overall operation KPI issued by the operator and currently managed radio network information;

c2. The Non-RT RIC forms a corresponding A1 policy by using the spectral efficiency index according to the format in Table 3.

c3. The Non-RT RIC sends the formed A1 policy to a Near-RT RIC through an A1 interface.

c4. The Near-RT RIC receives the A1 policy, which is related to the spectral efficiency index, from the A1 interface.

c5. The Near-RT RIC analyzes obtained radio resource related information of an RAN side. In a case that a current value or a predicted value of a spectral efficiency index of a target cell/target base station does not meet a policy target, the Near-RT RIC initiates an optimization and control process to perform a radio resource optimization, so as to guarantee the spectral efficiency target of the cell/base station.

In the information communication method of embodiments in the present disclosure, by receiving the target policy information, where the target policy information includes at least one of the following: the reliability index for indicating the success probability of data transmission; the bandwidth index for indicating the system bandwidth; the spectral efficiency index for indicating the spectral efficiency, a policy management capability can be improved by receiving such target policy information, such that various service requirements and system requirements of the radio network can be satisfied, thereby improving the capability for controlling and optimizing the radio network by the communications device.

As shown in FIG. 4, an embodiment of the present disclosure further provides a communications device, the communications device is a first communications device, including: a memory 420, a transceiver 410, and a processor 400, where the memory 420 is configured to store a computer program; the transceiver 410 is configured to send and receive data under control of the processor 400; and the processor 400 is configured to read the computer program in the memory 420 and perform the following operations:

obtaining target policy information;

sending the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

In FIG. 4, the bus architecture may include arbitrary quantity of interconnected buses and bridges, specifically, for linking various circuits including one or more processors represented by the processor 400 and the memory represented by the memory 420. The bus architecture may also link various other circuits such as a peripheral device, a voltage regulator, and a power management circuit which are well known in the art and therefore the description thereof will be omitted herein. The bus interface provides the interface. The transceiver 410 may include a plurality of elements, for example, a transmitter and a receiver, which provides a unit for communicating with various other apparatuses over a transmission medium, the transmission medium includes a wireless channel, a wired channel, an optical cable, and other transmission medium. The processor 400 is responsible for managing the bus architecture and general processing, and the memory 420 may store data to be used by the processor 400 when performing operations.

The processor 400 may be a central processing unit (Central Processing Unit, CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor can also adopt a multi-core architecture.

Optionally, the reliability index includes:

a first quantity of bytes of data transmission;

a first time required for data transmission; and a success probability of transmitting the first quantity of bytes within the first time.

Optionally, the bandwidth index includes: a maximum aggregation total system bandwidth.

Optionally, the spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

Optionally, the transceiver 410 is further configured to:

send, through an A1 interface, the target policy information to the second communications device.

Optionally, the target policy information includes the reliability index; and the processor 400 is further configured to:

obtain service related information, where the service related information includes: first data for representing a service scenario and second data for representing a service requirement; and perform, according to the service related information, a calculation to obtain the reliability index.

Optionally, the target policy information includes the bandwidth index; and the processor 400 is further configured to:

obtain a bandwidth requirement of a first cell or a first base station;

generate, according to the bandwidth requirement, a bandwidth index corresponding to the first cell or the first base station.

Optionally, the target policy information includes the spectral efficiency index; and the processor 400 is further configured to:

obtain a key performance indicator of operation management and currently managed radio network information; and obtain, according to the key performance indicator and the radio network information, a spectral efficiency index for each managed cell or each managed base station.

In the communications device provided by the embodiments of the present disclosure, by obtaining the target policy information and sending the target policy information to the second communications device, where the target policy information includes at least one of the following: the reliability index for indicating the success probability of data transmission; the bandwidth index for indicating the system bandwidth; the spectral efficiency index for indicating the spectral efficiency, the policy management capability can be improved with the new target policy information, such that various service requirements and system requirements of the radio network can be satisfied, thereby improving the capability for controlling and optimizing the radio network by the communications device.

It should be noted that the above-mentioned apparatus provided by the embodiments of the present disclosure can implement all method steps that are implemented in the method embodiments, and can achieve the same technical effects. The description and beneficial effects of these embodiments that are the same as those of the method embodiments will not be described in detail here.

Figure 5:
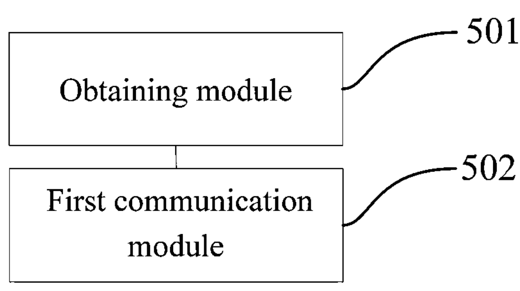
FIG. 5 is a first schematic view of modules in an information communication apparatus according to an embodiment of the present disclosure.

As shown in FIG. 5, an embodiment of the present disclosure further provides an information communication apparatus, the apparatus is applied to a communications device, where the communications device is a first communications device, and the apparatus may include:

an obtaining module 501, configured to obtain target policy information;

a first communication module 502, configured to send the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

Optionally, the reliability index includes:

a first quantity of bytes of data transmission;

a first time required for data transmission; and a success probability of transmitting the first quantity of bytes within the first time.

Optionally, the bandwidth index includes: a maximum aggregation total system bandwidth.

Optionally, the spectral efficiency index includes at least one of the following:

a spectral efficiency of a cell;

a spectral efficiency of a transmission point;

a spectral efficiency of a transmission reception point TRxP; or an edge spectral efficiency, wherein the edge spectral efficiency is a user spectral efficiency corresponding to a preset percentage of a cumulative distribution function.

Optionally, the first communication module 502 includes:

a sending unit, configured to send, through an A1 interface, the target policy information to the second communications device.

Optionally, the target policy information includes the reliability index; and the obtaining module 501 includes:

a first obtaining unit, configured to obtain service related information, where the service related information includes: first data for representing a service scenario and second data for representing a service requirement; and a calculating unit, configured to perform, according to the service related information, a calculation to obtain the reliability index.

Optionally, the target policy information includes the bandwidth index; and the obtaining module 501 includes:

a second obtaining unit, configured to obtain a bandwidth requirement of a first cell or a first base station; and a generating unit, configured to generate, according to the bandwidth requirement, a bandwidth index corresponding to the first cell or the first base station.

Optionally, the target policy information includes the spectral efficiency index; and the obtaining module 501 includes:

a third obtaining unit, configured to obtain a key performance indicator of operation management and currently managed radio network information; and a processing unit, configured to obtain, according to the key performance indicator and the radio network information, a spectral efficiency index for each managed cell or each managed base station.

In the information communication apparatus provided by the embodiments of the present disclosure, by obtaining the target policy information and sending the target policy information to the second communications device, where the target policy information includes at least one of the following: the reliability index for indicating the success probability of data transmission; the bandwidth index for indicating the system bandwidth; the spectral efficiency index for indicating the spectral efficiency, the policy management capability can be improved with the new target policy information, such that various service requirements and system requirements of the radio network can be satisfied, thereby improving the capability for controlling and optimizing the radio network by the communications device.

It should be noted that the division of modules and units in the embodiments of the present disclosure is illustrative, and is only a logical function division, and there may be other division manners in actual implementation. In addition, each functional unit in each embodiment of the present disclosure may be integrated into one processing unit, or each unit may physically exist separately, or two or more units may be integrated into one unit. The above-mentioned integrated units can be implemented in the form of hardware or in the form of software functional unit.

If the integrated units are implemented in the form of software function unit and sold or used as an independent product, it can be stored in a processor-readable storage medium. Based on such an understanding, the nature of the technical solution of the present disclosure, or in other words, the part that contributes to the related technology, or all or part of the technical solution can be embodied in the form of software product. The computer software product is stored in a storage medium, includes several instructions to enable a computing device (which may be a personal computer, a server, or a network device, etc.) or a processor (processor) to perform all or part of steps of the methods described in various embodiments of the present disclosure. The aforementioned storage medium includes: U disk, mobile hard disk, read-only memory (Read-Only Memory, ROM), random access memory (Random Access Memory, RAM), magnetic disk or optical disk and other medium that can store program codes.

It should be noted that the above-mentioned apparatus provided by the embodiments of the present disclosure can implement all method steps that are implemented in the method embodiments, and can achieve the same technical effects. The description and beneficial effects of the embodiments that are the same as those of the method embodiments will not be described in detail here.

In some embodiments of the present disclosure, a processor-readable storage medium is further provided, the processor-readable storage medium has program instructions stored thereon, and the program instructions are used to cause the processor to perform the following steps:

obtaining target policy information; and sending the target policy information to a second communications device;

where the target policy information includes at least one of the following:

a reliability index for indicating a success probability of data transmission;

a bandwidth index for indicating a system bandwidth; or a spectral efficiency index for indicating a spectral efficiency.

The program instructions, when being executed by the processor, may implement all implementations in the method embodiments applied to the communications device side as shown in FIG. 2, and the description thereof is omitted here for brevity.

Figure 6:
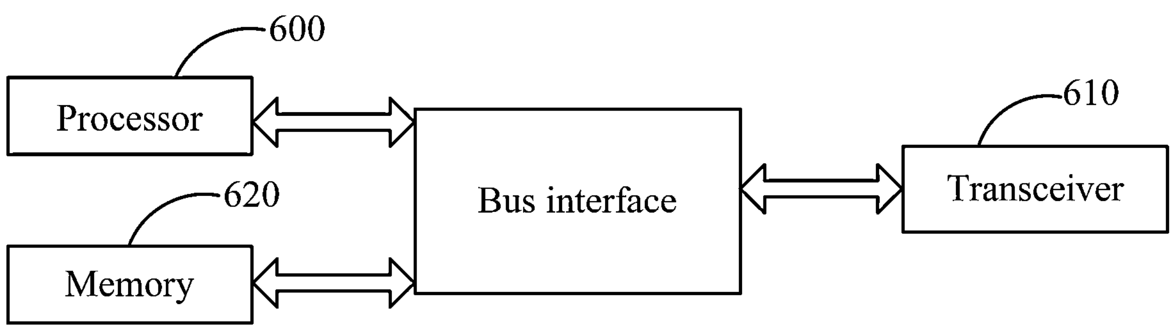
FIG. 6 is a second structural block diagram of an information communication apparatus according to an embodiment of the present disclosure.

As shown in FIG. 6, an embodiment of the present disclosure further provides a communications device, the communications device is a second communications device, including: a memory 620, a transceiver 610, and a processor 600, where the memory 620 is configured to store a computer program; the transceiver 610 is configured to send and receive data under control of the processor 600; and the processor 600 is configured to read the computer program in the memory 620 and perform the following operations:

receiving, through the transceiver 610, target policy information;

where the target policy information includes at least one of the following:

a reliability index for indicating a success probability of data transmission;

a bandwidth index for indicating a system bandwidth; or a spectral efficiency index for indicating a spectral efficiency.

In FIG. 6, the bus architecture may include arbitrary quantity of interconnected buses and bridges, specifically, for linking various circuits including one or more processors represented by the processor 600 and the memory represented by the memory 620. The bus architecture can also link various other circuits such as a peripheral device, a voltage regulator, and a power management circuit which are well known in the art and therefore the description thereof will be omitted herein. The bus interface provides the interface. The transceiver 610 may include a plurality of elements, for example, a transmitter and a receiver, which provides a unit for communicating with various other apparatuses over a transmission medium, the transmission medium includes a wireless channel, a wired channel, an optical cable, and other transmission medium. The processor 600 is responsible for managing the bus architecture and general processing, and the memory 620 may store data to be used by the processor 600 when performing operations.

The processor 600 may be a central processing unit (Central Processing Unit, CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor can also adopt a multi-core architecture.

Optionally, the reliability index includes:

a first quantity of bytes of data transmission;

a first time required for data transmission; and a success probability of transmitting the first quantity of bytes within the first time.

Optionally, the bandwidth index includes: a maximum aggregation total system bandwidth.

Optionally, the spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

Optionally, the transceiver 610 is further configured to:

receive, through an A1 interface, the target policy information sent by the first communications device.

Optionally, the processor 600 is further configured to:

obtain radio resource related information of a radio access network RAN side; and perform a radio resource optimization according to the radio resource related information and the target policy information.

In the communications device provided by the embodiments of the present disclosure, by receiving the target policy information, where the target policy information includes at least one of the following: the reliability index for indicating the success probability of data transmission; the bandwidth index for indicating the system bandwidth; the spectral efficiency index for indicating the spectral efficiency, the policy management capability can be improved by receiving the new target policy information, such that various service requirements and system requirements of the radio network can be satisfied, thereby improving the capability for controlling and optimizing the radio network by the communications device.

It should be noted that the above-mentioned apparatus provided by the embodiments of the present disclosure can implement all method steps that are implemented in the method embodiments, and can achieve the same technical effects. The description and beneficial effects of these embodiments that are the same as those of the method embodiments will not be described in detail here.

Figure 7:
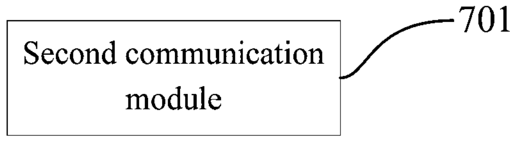
FIG. 7 is a second block diagram of modules in the information communication apparatus according to an embodiment of the present disclosure.

As shown in FIG. 7, an embodiment of the present disclosure further provides an information communication apparatus, the apparatus is applied to a communications device, the communications device is a second communications device, and the apparatus may include:

a second communication module 701, configured to receive target policy information;

where the target policy information includes at least one of the following:

a reliability index for indicating a success probability of data transmission;

a bandwidth index for indicating a system bandwidth; or a spectral efficiency index for indicating a spectral efficiency.

Optionally, the reliability index includes:

a first quantity of bytes of data transmission;

a first time required for data transmission; and a success probability of transmitting the first quantity of bytes within the first time.

Optionally, the bandwidth index includes: a maximum aggregation total system bandwidth.

Optionally, the spectral efficiency index includes at least one of the following:

a spectral efficiency of a cell;

a spectral efficiency of a transmission point;

a spectral efficiency of a transmission reception point TRxP; or an edge spectral efficiency, where the edge spectral efficiency is a user spectral efficiency corresponding to a preset percentage of a cumulative distribution function.

Optionally, the second communication module 701 includes:

a receiving unit, configured to receive, through an A1 interface, the target policy information sent by a first communications device.

Optionally, the apparatus further includes:

a second obtaining module, configured to obtain radio resource related information of a radio access network RAN side; and a processing module, configured to perform a radio resource optimization according to the radio resource related information and the target policy information.

In the information communication apparatus provided by the embodiments of the present disclosure, by receiving the target policy information, where the target policy information includes at least one of the following: the reliability index for indicating the success probability of data transmission; the bandwidth index for indicating the system bandwidth; the spectral efficiency index for indicating the spectral efficiency, the policy management capability can be improved by receiving the new target policy information, such that various service requirements and system requirements of the radio network can be satisfied, thereby improving the capability for controlling and optimizing the radio network by the communications device.

It should be noted that the division of modules and units in the embodiments of the present disclosure is illustrative, and is only a logical function division, and there may be other division manners in actual implementation. In addition, each functional unit in each embodiment of the present disclosure may be integrated into one processing unit, or each unit may physically exist separately, or two or more units may be integrated into one unit. The above-mentioned integrated units can be implemented in the form of hardware or in the form of software functional unit.

If the integrated units are implemented in the form of software function unit and sold or used as an independent product, it can be stored in a processor-readable storage medium. Based on such an understanding, the nature of the technical solution of the present disclosure, or in other words, the part that contributes to the related technology, or all or part of the technical solution can be embodied in the form of software product. The computer software product is stored in a storage medium, includes several instructions to enable a computing device (which may be a personal computer, a server, or a network device, etc.) or a processor (processor) to perform all or part of steps of the methods described in various embodiments of the present disclosure. The aforementioned storage medium includes: U disk, mobile hard disk, read-only memory (Read-Only Memory, ROM), random access memory (Random Access Memory, RAM), magnetic disk or optical disk and other medium that can store program codes.

It should be noted that the above-mentioned apparatus provided by the embodiments of the present disclosure can implement all method steps that are implemented in the method embodiments, and can achieve the same technical effects. The description and beneficial effects of the embodiments that are the same as those of the method embodiments will not be described in detail here.

In some embodiments of the present disclosure, a processor-readable storage medium is also provided, the processor-readable storage medium has a computer program stored thereon, and the computer program is used to cause the processor to perform the following steps:

receiving target policy information;

where the target policy information includes at least one of the following:

a reliability index for indicating a success probability of data transmission;

a bandwidth index for indicating a system bandwidth; or a spectral efficiency index for indicating a spectral efficiency.

The program, when being executed by the processor, may implement all implementations in the method embodiments applied to the communications device side as shown in FIG. 3, and the description thereof is omitted here for brevity.

The technical solutions provided by the embodiments of the present disclosure may be applied to various systems, including 5G system. For example, the applicable system may include any of global system of mobile communication (Global System of Mobile communication, GSM) system, code division multiple access (Code Division Multiple Access, CDMA) system, wideband code division multiple access (Wideband Code Division Multiple Access, WCDMA) general packet radio service (General Packet Radio Service, GPRS) system, long term evolution (Long Term Evolution, LTE) system, LTE frequency division duplex (Frequency Division Duplex, FDD) system, LTE time division duplex (Time Division Duplex, TDD) system, long term evolution advanced (Long Term Evolution Advanced, LTE-A) system, universal mobile telecommunication system (Universal Mobile Telecommunication System, UMTS), worldwide interoperability for microwave access (Worldwide Interoperability for Microwave Access, WiMAX) system, 5G New Radio (New Radio, NR) system, etc. The various systems each include a terminal device and a network device. The system may also include a core network part, such as an evolved packet system (Evolved Packet System, EPS), a 5G system (5GS), and the like.

The network device involved in the embodiments of the present disclosure may be a base station, and the base station may include multiple cells that provide services for terminals. Depending on different specific application occasions, the base station may also be referred to as an access point, or may be a device in the access network that communicates with the radio terminal devices through one or more sectors on the air interface, or other names. The network device may be configured to interchange received air frames and Internet Protocol (Internet Protocol, IP) packets, and may be served as a router between a radio terminal device and the rest part of the access network, where the rest part of the access network can include the Internet Protocol (IP) communications network. The network device may also coordinate attribute management for the air interface. For example, the network device involved in the embodiments of the present disclosure may be a network device (Base Transceiver Station, BTS) in global system for mobile communications (Global System for Mobile communications, GSM) or code division multiple access (Code Division Multiple Access, CDMA), or a network device (NodeB) in wide-band code division multiple access (Wide-band Code Division Multiple Access, WCDMA), or an evolved network device (evolutional Node B, eNB or e-NodeB) in long term evolution (Long Term Evolution, LTE) system, 5G base station (gNB) in the 5G network architecture (next generation system), or a home evolved base station (Home evolved Node B, HeNB), a relay node (relay node), a home base station (femto), a pico base station (pico) and the like, but the embodiments of the present disclosure are not limited thereto. In some network structures, the network device may include a centralized unit (Centralized Unit, CU) node and a distributed unit (Distributed Unit, DU) node, and the centralized unit and the distributed unit may also be geographically separately arranged.

The terminal device involved in the embodiments of the present disclosure may be a device that provides voice and/or data connectivity to a user, a handheld device with a radio connection function, or other processing device connected to a radio modem. In different systems, the name of the terminal device may be different. For example, in the 5G system, the terminal device may be called user equipment (User Equipment, UE). The radio terminal device may communicate with one or more core networks (Core Network, CN) via a radio access network (Radio Access Network, RAN), the radio terminal device may be a mobile terminal device, such as a mobile phone (or called a "cellular" phone) and a computer having a mobile terminal device, For example, the radio terminal device may be a portable, pocket, hand-held, computer built-in or vehicle-mounted mobile apparatus, which exchange voice and/or data with the radio access network. Examples may include devices such as personal communication service (Personal Communication Service, PCS) phones, cordless phone, session initiated protocol (Session Initiated Protocol, SIP) phone, wireless local loop (Wireless Local Loop, WLL) station, personal digital assistant (Personal Digital Assistant, PDA). The radio terminal device may also be called a system, a subscriber unit (subscriber unit), a subscriber station (subscriber station), a mobile station (mobile station), a mobile (mobile), a remote station (remote station), an access point (access point), a remote terminal device (remote terminal), an access terminal device (access terminal), a user terminal device (user terminal), a user agent (user agent), and a user device (user device), but the embodiments of the present disclosure are not limited thereto.

Each of the network device and the terminal device may use one or more antennas for multiple input multiple output (Multi Input Multi Output, MIMO) transmission, and the MIMO transmission may be single user MIMO (Single User MIMO, SU-MIMO) or multiple user MIMO (Multiple User MIMO, MU-MIMO). According to the shape and quantity of antenna combinations, the MIMO transmission may be two-dimensional multiple input multiple output (2 Dimension MIMO, 2D-MIMO), three-dimensional multiple input multiple output (3 Dimension MIMO, 3D-MIMO), fulldimensional multiple input multiple output (Full Dimension MIMO, FD-MIMO) or massive multiple input multiple output (massive-MIMO), or diversity transmission or precoding transmission or beamforming transmission, etc.

Those skilled in the art should understand that the embodiments of the present disclosure may be provided as method, system, or computer program product. Accordingly, the present disclosure may be in the form of a full hardware embodiment, a full software embodiment, or an embodiment combining software and hardware aspects. Furthermore, the present disclosure may be in the form of a computer program product embodied on one or more computer-usable storage media (including but not limited to magnetic disk storage and optical storage, etc.) having computer-usable program code stored thereon.

The present disclosure is described with reference to flowcharts and/or block diagrams of methods, devices (systems), and computer program products according to the embodiments of the present disclosure. It should be understood that each process and/or block in the flowchart and/or block diagram, and combination of processes and/or blocks in the flowchart and/or block diagram may be implemented by computer-executable instructions. These computer-executable instructions can be provided to a general-purpose computer, special purpose computer, embedded processor, or a processor of other programmable data processing device to produce a machine, such that an apparatus for realizing functions specified in one or more processes of the flowcharts and/or one or more blocks of the block diagrams may be generated by instructions being executed by the processor of the computer or other programmable data processing device.

These processor-executable instructions may also be stored in a processor-readable memory capable of causing the computer or other programmable data processing device to operate in a specific manner, such that the instructions stored in the processor-readable memory produce an article of manufacture including an instruction apparatus, the instruction apparatus may implement the functions specified in one or more processes of the flowcharts and/or one or more blocks of the block diagrams.

These processor-executable instructions can also be loaded into the computer or other programmable data processing device, which causes a sequence of operating steps to be executed on the computer or other programmable device for producing a computer-implemented process, so that the instructions executed on the computer or other programmable devices provide steps for realizing the functions specified in one or more processes of the flowcharts and/or one or more blocks of the block diagrams.

It should be noted that the division of the above modules is only a division of logical functions, which may be fully or partially integrated into one physical entity or physically separated in actual implementation. All of these modules can be implemented in the form of calling software through a processing element, or can be implemented in the form of hardware. Alternatively, some of these modules can be implemented in the form of calling software through a processing element, and some of these modules can be implemented in the form of hardware. For example, the determining module may be a separate processing element, or may be integrated in a chip of the above-mentioned apparatus. In addition, the determining module may be implemented by in the form of program codes stored in the memory of the above-mentioned apparatus, and a certain processing element of the above-mentioned apparatus may call the program codes and implement the function of the determining module. The similar applies to the implementation of other modules. In addition, all or part of these modules may be integrated together, or may be implemented independently. The processing element here may be an integrated circuit with a signal processing capability. In implementation, each step of the method or each module may be done by a hardware integrated logic circuit in the processor element or instructions in the form of software.

For example, each module, unit, subunit or submodule may be one or more integrated circuits configured to implement the method, for example: one or more specific integrated circuits (Application Specific Integrated Circuit, ASIC), or, one or multiple microprocessors (digital signal processor, DSP), or, one or more field programmable gate arrays (Field Programmable Gate Array, FPGA), etc. For another example, when one of the modules is implemented in the form of calling program codes by a processing element, the processing element may be a general-purpose processor, such as a central processing unit (Central Processing Unit, CPU) or other processor that can call the program codes. For another example, these modules can be integrated together and implemented in the form of system-on-a-chip (system-on-a-chip, SOC).

The terms "first", "second" and the like in the specification and claims of the present disclosure are used to distinguish similar objects, and are not necessarily used to describe a specific order or sequence. It should be understood that these term may be interchanged under appropriate circumstances such that the embodiments of the present disclosure described herein are practiced, for example, in sequences other than those illustrated or described herein. Furthermore, the terms "comprise" and "include", as well as any variations thereof, are intended to cover a non-exclusive inclusion, for example, a process, method, system, product or device comprising a sequence of steps or elements is not necessarily limited to those steps or units expressly listed, but may include other steps or elements not explicitly listed or inherent to the process, method, product or device. In addition, the use of "and/or" in the specification and claims means at least one of the connected objects. For example, A and/or B and/or C may denote 7 situations which includes A alone, B alone, C alone, both A and B, both B and C, both A and C, and all of A, B, and C. Similarly, the use of "at least one of A and B" in the present specification and claims should be understood as "A alone, B alone, or both A and B".

Various changes and modifications to the present disclosure can be made without departing from the spirit and scope of the present disclosure. Thus, if these changes and modifications of the present disclosure fall within the scope of the claims of the present disclosure and equivalents thereof, these modifications and variations are intended to be covered by the present disclosure.

What is claimed is:

1. An information communication method, performed by a communications device, wherein the communications device is a first communications device, the first communications device is a non-real-time radio access network intelligent controller in an open radio access network (O-RAN) architecture, and the method comprises:

obtaining target policy information; and sending the target policy information to a second communications device, wherein the second communications device is a near real time radio access network intelligent controller in the O-RAN architecture;

wherein the target policy information comprises AI policy information;

wherein the target policy information comprises a bandwidth index for indicating a system bandwidth, and the obtaining the target policy information comprises:

obtaining a bandwidth requirement of a first cell or a first base station; and generating, according to the bandwidth requirement, a bandwidth index corresponding to the first cell or the first base station;

and/or wherein the target policy information comprises a spectral efficiency index for indicating a spectral efficiency, and the obtaining the target policy information comprises:

obtaining a key performance indicator of operation management and currently managed radio network information; and obtaining, according to the key performance indicator and the radio network information, a spectral efficiency index for each currently managed cell or each currently managed base station.

2. The method according to claim 1, wherein the target policy information further comprises a reliability index for indicating a success probability of data transmission;

wherein the reliability index comprises:

a first quantity of bytes of data transmission;

a first time required for data transmission; and a success probability of transmitting the first quantity of bytes within the first time.

3. The method according to claim 2, wherein the target policy information comprises: a scenario context of a service; and the reliability index is associated with the scenario context.

4. The method according to claim 1, wherein the bandwidth index comprises: a maximum aggregation total system bandwidth.

5. The method according to claim 1, wherein the spectral efficiency index comprises at least one of the following:

a spectral efficiency of a cell;

a spectral efficiency of a transmission point;

a spectral efficiency of a transmission reception point (TRxP); or an edge spectral efficiency, wherein the edge spectral efficiency is a user spectral efficiency corresponding to a preset percentage of a cumulative distribution function.

6. The method according to claim 1, wherein the sending the target policy information to the second communications device comprises:

sending, through an AI interface, the target policy information to the second communications device.

7. An information communication method, performed by a communications device, wherein the communications device is a second communications device, the second communications device is a near real time radio access network intelligent controller in an open radio access network (O-RAN) architecture, and the method comprises:

receiving target policy information from a first communications device, wherein the first communications device is a non-real-time radio access network intelligent controller in the O-RAN architecture;

wherein the target policy information comprises AI policy information;

wherein the target policy information comprises a bandwidth index for indicating a system bandwidth, which comprises a bandwidth index corresponding to a first cell or a first base station that is generated according to a bandwidth requirement of the first cell or the first base station;

and/or wherein the target policy information comprises a spectral efficiency index for indicating a spectral efficiency, which comprises a spectral efficiency index for each currently managed cell or each currently managed base station that is obtained according to a key performance indicator of operation management and currently managed radio network information.

8. The method according to claim 7, wherein the target policy information further comprises a reliability index for indicating a success probability of data transmission;

wherein the reliability index comprises:

a first quantity of bytes of data transmission;

a first time required for data transmission; and a success probability of transmitting the first quantity of bytes within the first time.

9. The method according to claim 7, wherein the bandwidth index comprises: a maximum aggregation total system bandwidth.

10. The method according to claim 7, wherein the spectral efficiency index comprises at least one of the following:

a spectral efficiency of a cell;

a spectral efficiency of a transmission point;

a spectral efficiency of a transmission reception point (TRxP); or an edge spectral efficiency, wherein the edge spectral efficiency is a user spectral efficiency corresponding to a preset percentage of a cumulative distribution function.

11. The method according to claim 7, wherein the receiving the target policy information comprises:

receiving, through an AI interface, the target policy information sent by the first communications device.

12. The method according to claim 7, wherein after the receiving the target policy information, the method further comprises:

obtaining radio resource related information of a radio access network (RAN) side; and performing a radio resource optimization according to the radio resource related information and the target policy information.

13. A communications device, the communications device being a second communications device, the second communications device being a near real time radio access network intelligent controller in an open radio access network (O-RAN) architecture, the second communications device comprising: a memory, a transceiver, a processor, wherein the memory is configured to store a computer program; the transceiver is configured to send and receive data under control of the processor; and the processor is configured to read the computer program in the memory and perform the method according to claim 7.

14. The communications device according to claim 13, wherein the target policy information further comprises a reliability index for indicating a success probability of data transmission;

wherein the reliability index comprises:

a first quantity of bytes of data transmission;

a first time required for data transmission; and a success probability of transmitting the first quantity of bytes within the first time;

wherein the bandwidth index comprises: a maximum aggregation total system bandwidth;

wherein the spectral efficiency index comprises at least one of the following:

a spectral efficiency of a cell;

a spectral efficiency of a transmission point;

a spectral efficiency of a transmission reception point (TRxP); or an edge spectral efficiency, wherein the edge spectral efficiency is a user spectral efficiency corresponding to a preset percentage of a cumulative distribution function.

15. A communications device, the communications device being a first communications device, the first communications device being a non-real-time radio access network intelligent controller in an open radio access network (O-RAN) architecture, the first communications device comprising: a memory, a transceiver, and a processor, wherein the memory is configured to store a computer program; the transceiver is configured to send and receive data under control of the processor; and the processor is configured to read the computer program in the memory and perform the following operations:

obtaining target policy information; and sending, through the transceiver, the target policy information to a second communications device, wherein the second communications device is a near real time radio access network intelligent controller in the O-RAN architecture;

wherein the target policy information comprises AI policy information;

wherein the target policy information comprises a bandwidth index for indicating a system bandwidth, and the obtaining the target policy information comprises:

obtaining a bandwidth requirement of a first cell or a first base station; and generating, according to the bandwidth requirement, a bandwidth index corresponding to the first cell or the first base station;

and/or wherein the target policy information comprises a spectral efficiency index for indicating a spectral efficiency, and the obtaining the target policy information comprises:

obtaining a key performance indicator of operation management and currently managed radio network information; and obtaining, according to the key performance indicator and the radio network information, a spectral efficiency index for each currently managed cell or each currently managed base station.

16. The communications device according to claim 15, wherein the target policy information further comprises a reliability index for indicating a success probability of data transmission;

wherein the reliability index comprises:

a first quantity of bytes of data transmission;

a first time required for data transmission; and a success probability of transmitting the first quantity of bytes within the first time;

wherein the bandwidth index comprises: a maximum aggregation total system bandwidth;

wherein the spectral efficiency index comprises at least one of the following:

a spectral efficiency of a cell;

a spectral efficiency of a transmission point;

a spectral efficiency of a transmission reception point (TRxP); or an edge spectral efficiency, wherein the edge spectral efficiency is a user spectral efficiency corresponding to a preset percentage of a cumulative distribution function.

17. The communications device of claim 16, wherein the target policy information comprises a scenario context of a service; and the reliability index is associated with the scenario context.

18. The communications device according to claim 15, wherein the transceiver is further configured to:

send, through an AI interface, the target policy information to the second communications device.

* * * * *